United States Patent [19]

Parker

[11] Patent Number: 5,270,084
[45] Date of Patent: Dec. 14, 1993

[54] INSULATING GLASS UNIT

[75] Inventor: Kenneth R. Parker, Whitby, Canada

[73] Assignee: Parker Design Limited, Whitby, Canada

[21] Appl. No.: 589,096

[22] Filed: Sep. 27, 1990

[30] Foreign Application Priority Data

Sep. 28, 1989 [CA] Canada .................. 615,260

[51] Int. Cl.$^5$ .......................... E06B 3/24; C03C 27/00
[52] U.S. Cl. ......................................... 428/34; 52/788; 52/789; 52/790; 156/109
[58] Field of Search ................. 428/34, 119, 120, 213, 428/215; 52/788, 789, 790; 156/107, 109

[56] References Cited

U.S. PATENT DOCUMENTS

| | | | |
|---|---|---|---|
| 2,589,064 | 3/1952 | Drake | 20/56.5 |
| 2,756,467 | 7/1956 | Etling | 428/34 |
| 3,192,575 | 7/1965 | Rosenau | 428/34 |
| 3,608,265 | 9/1971 | Meunier | 52/616 |
| 3,921,359 | 11/1975 | Brichard et al. | 52/616 |
| 3,981,111 | 9/1976 | Berthagen | 52/171 |
| 3,990,201 | 11/1976 | Falbel | 52/171 |
| 4,109,431 | 8/1978 | Mazzoni | 428/34 |
| 4,132,218 | 1/1979 | Bennett | 126/270 |
| 4,289,113 | 9/1981 | Whittemore | 126/418 |
| 4,433,016 | 2/1984 | Heely, Jr. et al. | 428/34 |
| 4,542,611 | 9/1985 | Day | 52/172 |
| 4,607,468 | 8/1986 | Paquet | 52/171 |
| 4,613,530 | 9/1986 | Hood et al. | 428/34 |
| 4,683,634 | 8/1987 | Cole | 29/412 |
| 4,721,636 | 1/1988 | Hood et al. | 428/38 |
| 4,786,344 | 11/1988 | Beuther | 456/109 |
| 4,791,773 | 12/1988 | Taylor | 52/780 |
| 4,928,448 | 5/1990 | Phillip | 428/34 |

FOREIGN PATENT DOCUMENTS

| | | |
|---|---|---|
| 2520062 | 4/1975 | Fed. Rep. of Germany . |
| 3048951 | 7/1982 | Fed. Rep. of Germany . |
| 2492956 | 10/1980 | France . |

OTHER PUBLICATIONS

Thermal Conductivity ... Low Pressures By Hardee & Green Sc. Tm. $\epsilon$-309.

Primary Examiner—Donald J. Loney
Attorney, Agent, or Firm—Bereskin & Parr

[57] ABSTRACT

A sealed insulated glass unit is made up of an assembly of at least two panes of glass of the same areal dimensions in registering parallel spaced relationship. Small spacer members are sandwiched between the panes to maintain their spacing. A cap of impervious material covers and adheres to the peripheral edges of the panes and bridges the gap between them to form a hermetically sealed chamber. The chamber is under partial vacuum whereby implosive pressure urges the panes and cap together in a cohesive unit. A method of making the unit involves forming an assembly of at least two panes having registering peripheral edges while inserting and maintaining in place between them a plurality of small thin flat spacing members. The assembly is maintained in place while the cap of sealing material is applied to the entire periphery to adhere to the edges of the panes and to bridge the gap between them to form a closure establishing a closed chamber between the panes. Communication is established through the cap through which vacuum is applied and the communication is closed off to form a permanent final closure containing partial vacuum within the chamber.

17 Claims, 1 Drawing Sheet

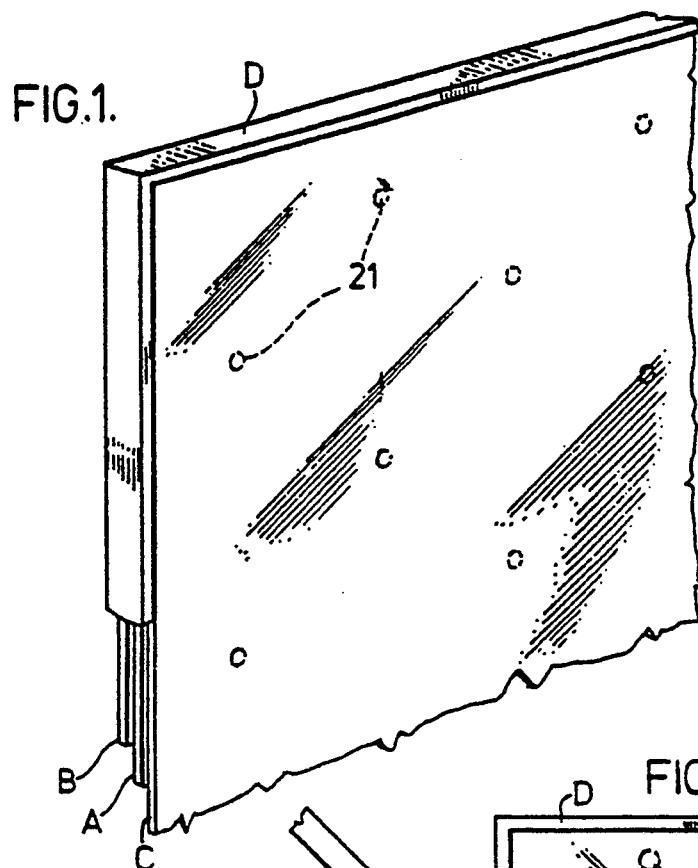
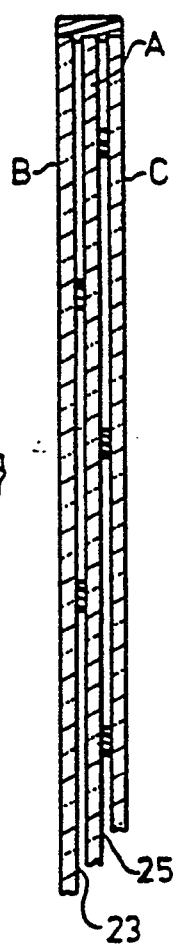
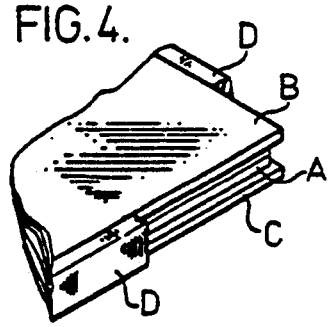
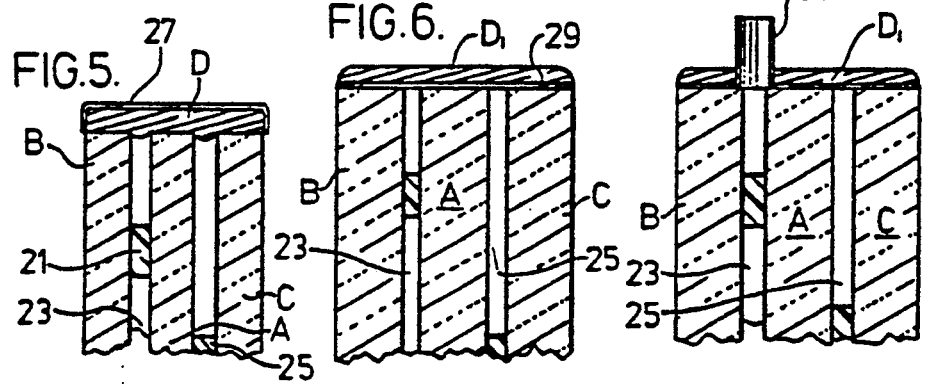

INSULATING GLASS UNIT

BACKGROUND OF THE INVENTION

1. Field of the Invention

This invention relates to a multi-pane glass glazing unit.

Such units are used for residential and commercial construction where controlled light transmittance and low sound and heat transmittance is desirable.

2. Description of the Prior Art

Units of this type and their properties are described in the Canadian Building Digest, put out by the Division of Building Research, National Research Council of Canada, October 1963 in an article "Factory-Sealed Double-Glazed Units" by Solvason and Wilson.

The structure described in this article is a typical insulating glass unit having two panes spaced-apart by a hollow metal spacer containing a desiccant surrounded by one or two sealants between the frame and the pane. One disadvantage of this type of structure is that the air in the space between the panes readily conducts heat and sound. Another disadvantage is that the glass panes pump, i.e. they bow in and out with barometric or temperature changes. This interferes with the aesthetic qualities of the structure since reflections are distorted. It is also destructive to the seal and predisposes the the units to breakage.

Another problem with a metal spacer is that heat is transferred at the edges causing interior perimeter condensation and thermal stresses which also predisposes the unit to breakage. Further, the desiccants are expensive and tend to affect the internal air pressure of the unit. At low temperatures, the desiccant can absorb nitrogen from the air causing the glass to bow in. At high temperatures, the reverse takes place.

In an attempt to overcome these problems, very expensive glazing designs are used with sophisticated sealants with movement capabilities to contain the glass edges.

The types of structure described represent nearly all the production of insulating glass units in the world.

The applicant proposes to depart from this normal commercial pattern in overcoming the problems by the use of a structure in which there is a partial vacuum between the panes. As far as the applicant is aware, this expedient has not been employed commercially, even though there are examples in the patent literature of the use of a vacuum. In one patent, a double-glazed structure is disclosed in which there is a vacuum between the panes which are spaced-apart by special spacers adhered to at least one of the panes and a sealing compound is applied between the margins only of the respective panes and not on their peripheral edges. The structure is evacuated temporarily by providing an opening within the area of one of the panes through which a hollow stem or stud is embedded as a passage for supplying vacuum. The device is equipped with an alarm system which is triggered by loss of vacuum. This alarm system appears to be the primary purpose of this patented structure.

In another patented double-glazed structure, one of the panes is also provided with an opening within its area through which vacuum is drawn. The opening is connected to a vacuum pump which is controlled by an outside thermostat which applies a temporary vacuum for insulating purposes when required. There is also the suggestion in the patent that an evacuated space between the panes could be hermetically sealed, baked out, and gettered to maintain a vacuum for long periods of time, thereby eliminating the requirement for the vacuum pump. In the actual structure shown, a sealing means in the form of an O-ring is applied between the margins of the respective panes. A frame, which has nothing to do with maintaining the vacuum, surrounds the peripheral edges.

These structures are in the nature of specialty items and do not provide the requirements of a day-to-day multiple glazed structure which can be manufactured commercially and employed in the place of the commercial construction described above. It is not apparent from descriptions of these patents how a practical commercial permanently sealed structure can be manufactured.

The applicant now provides a practical commercial permanently sealed partially evacuated multi-glazed unit.

SUMMARY OF THE INVENTION

A preferred unit, according to the invention, comprises a central pane of glass flanked at each side, in parallel relationship, by an overlapping companion pane of the same dimensions. Each pane has peripheral edges registering, in the cross-sectional direction, with the edges of the other pane to provide the unit with a periphery. Each companion pane is spaced-apart from the central pane by a plurality of small thin flat non-rigid spacing members in contact with the surface of each pane, but free from bonding thereto, thereby to provide a thin space between the central pane and each companion pane. Each spacing member between the central pane and a companion pane is spaced in the lateral direction from any spacing member between the central pane and the other companion pane. A cap of sealing material covers the periphery of the panes and bridges the space between them, thereby sealing them together and providing a sealed chamber between each companion pane and the central pane. The sealing material adheres to the edges of the panes. Each chamber is under a permanent partial vacuum whereby external pressure draws the companion pane towards the central pane and the sealing means against the edges of the panes, with the spacing members sandwiched between the surfaces of the respective panes and thus maintained in place.

The assembly is held together by the fact that the external atmospheric pressure presses the panes inward against the spacing member and does not depend on a peripheral frame to give structural strength as in prior art constructions. This permits the use of sealing materials which lack structural strength, but which are good in other properties, for example, malleability, adhesion and vapor impermeability.

In one construction, according to the invention, the sealing means is a mastic ribbon of a plastic sealant of low cohesive strength and low moisture-vapor transmission rate impermeable to gases whereby it is capable of providing a permanent seal. The cap of mastic material is not only highly adhesive to the edges of the pane but is also urged towards the periphery of the unit by the ambient outside pressure. In making the unit, the mastic ribbon is applied about the entire periphery, vacuum is drawn through a probe penetrating the mastic material in a small puncture. As the probe is withdrawn, the small puncture made by it is closed by the self-healing nature of the mastic material so that the ribbon is to all intents imperforate.

A metal foil finishing strip, preferably of aluminum foil, having a thickness of 0.003 to 0.007 inches, desirably of about 0.004 inches, can be applied on top of the mastic film. This foil will adhere to the mastic without additional adhesive. Such a finish provides the advantage of screening the tack of the mastic and easing the handling of units which are glazed on the job site, as opposed to those glazed in-plant. It also provides an additional moisture-vapor transition barrier.

According to another construction, the cap of sealing material is a layer of solder covering the peripheral edges of the panes and extending across the gap between them. To precondition the glass surface, the edges of the panes are primed with a thin film of copper applied continuously from an oxyacetylene apparatus. The application of the copper layer and subsequent tinning with a film of molten solder is a conventional practice well known in the art. The solder is applied progressively over the copper film, about the periphery of the panes and bridging the gap between them. In this process, a small tube is placed in the solder layer, extending through it to the chamber between the panes. A partial vacuum is drawn through this tube and ultimately the tube pinched and melted to seal off the vacuum-containing chamber. The use of solder as a sealing material is useful where temperatures above 250° F. are encountered, for example, in a solar collector, or where particularly high performance is required as, for example, in an aquarium.

It should be noted that, in the applicant's structure, the sealing cap which extends about the periphery of the glazed unit, does not require any substantial structural capacity. The unit gains its strength from the fact that the panes are urged inward towards each other by ambient atmospheric pressure and this pressure is distributed over the spacing members between the panes. Likewise, the cap is urged against the edges of the panes by atmospheric pressure.

This departs from a fixation in the art that the sealant for multi-glazed structures has to have major structural strength as well as moisture-vapor transmission resistance. For example, there is reported in *Glass Digest* for Apr. 15, 1983, a meeting of SIGMA (Sealed Insulating Glass Manufacturers' Association) in which Mr. Robert Perry, Vice-President, General Manager of the Flat Glass Division of PPG Industries, Pittsburgh, is quoted. Mr. Perry concludes "We will soon see a single sealant that meets all requirements of insulating glass construction by matching very low moisture-vapor transmission with superior structural capacity".

The Glass Distest for Dec. 15, 1982 quotes Mr. Marvin B. Newton, who is Manufacturing Manager/Butyl and Vinyl Products, Protective Treatments Inc., Dayton, Ohio. Mr. Newton observes that there are a large number of rather diverse characteristics (of sealants) all of which must be considered when producing a useful and marketable sealant. None of these properties, he says, can be ignored, but equally obviously no sealant yet exists—or is even likely to exist—that has all the desirable qualities at the optimum level. Development research operates as do those in manufacturing—we work with trade-offs. We strive to create products with more positive than negative qualities, and we strive continually to improve these products. Thats the nature of development research.

It is evident from these statements that the art is still striving to employ structures in which the sealants not only have the properties of gas impermeability but also structural capacity. The applicant's construction, in contrast, selects sealants for their gas impermeability and adhesive qualities without having to compromise for those that also have structural strength. This is a significant departure in the art.

BRIEF DESCRIPTION OF THE DRAWINGS

Having thus generally described the invention, it will be referred to in more detail by reference to the accompanying drawings, which illustrate a preferred embodiment, and in which:

FIG. 1 is a fragmentary perspective view of a glazing unit, according to the invention, with the peripheral sealing means partly removed for illustrative purposes. The various parts of the unit are shown on an enlarged scale for the sake of clarity;

FIG. 2 is a cross-section as along the line 2—2 of FIG. 1;

FIG. 3 is a fragmentary plan view of the unit shown in the previous Figures, demonstrating the relationship of an evacuating needle to draw vacuum.

FIG. 4 is a gragmentary perspective view showing the construction in which a corner of the central pane is cutaway to provide a communication between the respective vacuum chambers;

FIG. 5 is a fragmentary cross-section as along the line 5—5 of FIG. 1 in which a mastic cap is used;

FIG. 6 is a view similar to FIG. 5 in which solder is used as the capping material;

FIG. 7 is a view similar to FIG. 6 illustrating a step in the application of the solder cap in which a tube is inserted in the cap for the purpose of drawing a vacuum.

DESCRIPTION OF THE PREFERRED EMBODIMENTS

More specific reference will now be made to the drawings. First the unit of FIGS. 1 to 5 will be described.

The glazing unit illustrated includes an assembly of a central glass pane A, flanked on one side by companion pane B, and on the other by a companion pane C of the same configuration.

Thin flat spacing discs 21 intervene the pairs of panes A and B, and A and C, respectively, holding them apart in parallel relationship, to provide a thin space 23 between the panes A and B, and a similar space 25 between the panes A and C. A sealing cap D spanning the periphery of the assembly, of a nature to be described later in detail, provides a gas-tight seal about the periphery of the assembly of panes A, B and C, so that the spaces 23 and 25 become hermetically sealed chambers. The chambers 23 and 25 are provided with a permanent partial vacuum, as will become apparent from the following description of the way in which the glazing unit is manufactured.

A preferred way of manufacturing the unit is as follows.

With the pane A horizontal, the discs 21 are appropriately placed on its surface and the pane B is stacked on the discs. Then, discs are placed on the pane B and pane C stacked on the discs, so that an assembly is formed with the panes A, B and C juxtaposed and the discs between them.

A cap of mastic adhesive D, in ribbon form, is then applied progressively about the perimeter of the assembly, preferably starting near a corner. The end of the adhesive ribbon is adhered and thus anchored to the free edge of the glass at the starting point, and progressively adhered to the exposed edges of the panes A, B and C so that it caps the entire width of the periphery of the assembly, covering the spaces between the respective panes A, B and C. The free end of the ribbon is ultimately butted gainst the anchored end to form a gas-tight final joint.

The mastic adhesive may be applied from a preformed ribbon, but preferably applied on an automated production line. The mastic would be extruded into ribbon form directly from slug form in an extruder, and the ribbon applied progressively against the perimeter of the glass.

Desirably a metal foil finishing strip 27 is applied over the top of the mastic cap D. Such a strip is preferably of aluminum foil.

It is seen, therefore, that an assembly is provided of the respective panes A, B and C, sandwiching between them the spacing discs and enclosing between them the respectively hermetically sealed chambers 23 and 25.

Partial vacuum is applied to each of the chambers 23 and 25 preferably as follows. A hypodermic needle H connected to a vacuum tank is inserted, desirably at an angle, preferably of about 45°, through the mastic cap into the chamber 23. This can be done anywhere along the perimeter of the unit. The same is then done in connection with the chamber 25. Once the desired vacuum has been drawn, the hypodermic needle is partially removed and pressure is applied to the mastic tape behind the tip of the needle so that, as the needle is withdrawn, the closure of the puncture made by the needle is assured prior to complete removal of the needle. The "self-healing" nature of the mastic material results in the small puncture made in it by the hypodermic needle being completely closed before the needle is withdrawn, to exclude passage of gas.

An alternative construction, according to the invention, is shown in FIGS. 6 and 7. Here the sealing cap is a continuous layer $D_1$ of solder which extends around the periphery of the unit. In applying the layer $D_1$ a thin priming film 29 of copper is first applied to the edges of the glass. For the purpose of drawing a vacuum, a solder tube 31 is employed, extending through the solder layer. Vacuum is drawn through the tube and it is then pinched off and heat-sealed into the solder cap.

COMPONENTS

The nature of the various components making up the glazing unit are as follows.

Glass

The nature of the glass is not critical. However, the structure of the invention does lend itself to the use of thin glass from about 2 mm to about 6 mm, preferably 3 mm, thick. Desirably, specialty high performance glass is employed. Low emissivity glass is of particular advantage because it can give extremely high insulation values. The normal degradation of this type of glass by oxidation is minimized, in the applicant's construction, by the lack of oxygen in contact with its surface.

These glasses defy adhesion by existing methods, because of their metallic coating. The normal difficulty of bonding the mastic to the edge of the glass is overcome to a large extent by the fact that atmospheric pressure urges the capping material against the perimeter of the unit and the partial vacuum tends to suck it into the spaces between the respective panes and to insure the seal between the glass and the capping material.

The use of thinner glass is possible because the stresses are shared by the respective panes which are laminated together. In a conventional triple pane unit, each pane would have to be as strong as the overall structure of a unit according to the invention. The glass may be completely transparent or have a tint.

Spacers

The spacers are preferably made of thin transparent plastic sheet material coming directly from calender rollers so that their surfaces are press-polished. A preferred material is plasticized polyvinyl chloride containing ultraviolet inhibiters. Desirably, the spacers are discs from 1/16 th of an inch to $\frac{1}{4}$ of an inch in diameter. The discs are punched out of a flat sheet of the material and are clear and transparent. Preferably, the spacers have an initial thickness from about 20 to 40 thousandths of an inch so as to set the spacing between the panes accordingly.

The spacers are preferably spaced-apart from about $\frac{1}{2}$ to about 2 inches center to center with $1\frac{1}{2}$ inch centers preferred. The spacers are staggered so that the space between a spacer spacing one pair of panes and the spacer spacing the other is as far apart as possible so as to avoid a direct conductive path, through the spacers. The spacers are not bonded to the surface of the glass and only held in place by being sandwiched between panes under the pressure of the atmosphere. So, if this pressure is relieved by failure of the partial vacuum, the spacers, in a vertically placed glazing unit, act as telltales and gravitate to the bottom of the unit.

A specific sheet material from which the spacers may be made is press-polished clear vinyl sheet sold under the trade mark "Ultralite" by Herbert Lushan Plastics Corp., Newton, Mass. This material is also identified as "Dot-240, AS-6, M-1 0.040 inch thick clear flexible plastic safety glazing material" which is said to comply with the United States and Canadian Federal Motor Vehicle Safety Standard No. 205. It is said to comply with the following tests: No. 2, luminous transmittance, No. 16, weathering test, No. 19, chemical resistance, nonstressed, No. 20, chemical resistance, stressed, No. 22, flexibility test, No. 23, flammability test. Under weathering test, No. 16, of the Code, there are no bubbles or other noticeable decomposition and only slight discoloration.

The spacers are non-rigid and are compressed slightly between the panes.

Spacers of the type described will compress approximately 10% so this should be taken into consideration in the desired spacing between the panes. Compression of these spacers improves their optical quality over and above the fairly good optical qualities the material is given by calendering.

Capping Agent

A preferred capping agent is mastic material, the selection of which is important.

Mastic materials must be employed which have the necessary characteristics, for the present use, namely workability to enable them to be applied to the edges of the glass and which have sufficiently low moisture-vapor transmission rate and are impermeable to gases to maintain the vacuum, are non-fogging and have good adhesion to glass. Such materials include polysulfide polymers, urethane polymers, acrylic polymers, and styrene-butadiene polymers. These materials may be characterized as "deformable", that is to say, the material is, at least, initially in capable of resisting compressive forces exerted upon it, even though, after application, it may be capable of resisting such forces.

A preferred mastic material is sold under the designation "Tremco JS780" (trade mark). The manufacturer's data sheet described this as a 100% solids, butylpolyisobutylene insulating glass sealant. It has an exceptionally low moisture-vapor transmission rate. It is non-fogging. It has excellent adhesion to glass and metal spacer bar. It has excellent ultravoilet resistance. The application temperature range is given as 10° C. to 104° C. It is offered in a variety of round preformed sizes, multi-extruded on release paper. It is available in bulk slug sizes for extruder application of 192 mm by 240 mm -7.3 kg, 242 mm by 275 mm -12.7 kg. Its color is black. The physical properties are specific gravity 1.02, consistency 55 to 65 (ASTM D-5 at 25° C., percent solids 100%, odor nil, color black, moisture-vapor transmission rate 0.15 g/sq.m/24 hrs., ASTM E-6-53T procedure E.) The performance characteristics are it has no visible fogging. Its adhesion is excellent glass at 25° C., immersed in water UV, UV underwater, UV through glass, at 70° C., at minus 17° C. It is flexible down to −29° C. Oil migration is none when sealed between two pieces of metal to hold it together and conditioned for seven days at 70° C. The service temperature range is from −46° C. to 121° C. It is unaffected by water. As for ageing, it has excellent ozone ultraviolet resistance.

The thickness of the mastic cap may run from about 1/16th to about 3/16ths of an inch with about ⅛th preferred. The cap will be generally rectangular in cross-section.

Where metal foil is used to cover the mastic this will generally extend down the sides of the mastic. This foil is preferably aluminum and has a thickness from about 0.003 to 0.007 inches with a preferred thickness of about 0.004 inches.

Where solder is employed as the capping material, the selection and application of the solder and priming copper film will be understood to those skilled in the art.

The thickness of the solder will be within the range from about 1/12th to 1/6th of an inch.

An alternative capping material is solder, as described above. The materials employed are conventional and their application to the unit will be clear to one skilled in the art.

Glazing Unit

For full understanding of the construction of the complete glazing unit and its properties, a comparison with prior art units may be helpful.

The unit lacks a heavy frame comparable to that of double-glazed units enclosing an air space, for example, those shown in Canadian Patent 1,126,581, Greenlee, Jun. 29, 1982. The sealing cap is purely on the periphery of the unit and does not overlap the sighting area of the glass, and therefore, provides a maximum field of vision. A unit, according to the invention, is also superior in terms of reducing sound transmission.

The panes are held apart by spacers distributed over their surfaces rather than being spaced-apart by a marginal frame. The unit contains no desiccant. The panes do not have any opening within their area to weaken the glass but, rather, evacuation is effected at the margin through the sealant after it is applied. The nature of the sealant used for the caps enables a permanent partial vacuum to be maintained on the chambers between the panes. A preferred range of permanent partial vacuum within the chambers 23 and 25 is from about 43 cm to about 76 cm of mercury. The chambers 23 and 25 may be partially filled with other gases than air.

A glazing unit of the invention has a structural strength beyond that of conventional units, which permits the glazing of larger surface areas. The strength is provided by the laminated construction in which internal and external pressures are distributed to all the panes. For example, by reason of the special spacers of the invention, wind load on a glazing unit of the invention is carried by all the panes rather than just the exterior or interior panes.

A glazing unit, according to the invention, will have an improved "U-value" over and above conventional units. The "U-value" is a measurement well known in the art. It represents British thermal units per hour per square foot per degree Fahrenheit of energy transferred through the structure. When calculating U-value, a number of assumptions have to be made. For example, the variables are inside temperature, outside temperature, air velocity inside, air velocity outside, and solar intensity. Using the assumptions accepted in the industry, the U-value of a conventional unit having three panes of glass, with the outside panes spaced half an inch from the central pane, the U-value is calculated at 0.34. The U-value of a triple glazed unit, according to the invention, without a low emissivity film on the glass would be about 0.17. The U-value of such a unit with low emissivity glass in each of the panes would be about 0.022. The combined use of partial vacuum and of the low emissivity coating results in a "super" unit.

It is also contemplated that low emissivity tinted glass could be used further to improve the performance of the unit in a warm climate where air conditioning is employed and it is desirable to restrict solar gain.

While the invention has been described in terms of a unit having three panes, two or more panes may be employed. Up to five panes may be employed.

It is important to note that a glazing unit, according to the invention, does not rely for its strength on the frame, but on the fact that the chamber or chambers within the unit are under partial vacuum, whereby implosive pressure is exerted inwardly on the panes and the cap.

The applicant would like to note further points. The mastic material is non-gassing, that is not susceptible to vacuum extraction of volatile substances from it. The preferred mastic materials described above have this property.

In the applicant's unit, there will be little movement between the panes and little residual stress at the bonding interface. What movement there might be is taken care of by the low cohesive strength of the bonding material where mastic is used. In the preferred structure, the metal foil facing on the mastic further reduces the possibility of gas permeation. Where solder is used, as capping agent, while applying the solder, the panes are placed under compression so that their ultimate spacing is achieved before the partial vacuum is applied.

The spacers are preferably free floating, that is, not adhered to the surface of the glass. So, if vacuum fails the spacers will gravitate out of position and signal the failure. The resilience of the spacers between the glass under compression causes them to diminish from their original thickness about 5% to about 10%, with about 8% the ideal.

The overall thickness of a triple glazed unit, according to the invention, will range from about 6.8 mm to about 9.8 mm, ideally around 9 mm. The spaces range from about 0.4 to about 0.16 mm in thickness with the optimum being at the lower end of the range. A conventional glazing unit, as for example, described in the Canadian Building Digest, mentioned above, would be in the range from about 33 mm to about 42 mm. So, the applicant's construction is thinner, lighter, stronger, and less expensive to make.

The vacuum spaces between respective panes may be separate or connected to one another, for example, by a passage formed by removing a corner of the intervening pane.

Advantages

A number of advantages will be evident from the previous description. Among the advantages mentioned and others are the following.

The applicant's construction acquires its strength from rather than fighting atmospheric pressure, it tends to hold its components in place.

Sealing materials can be employed which do not have to have any particular structural strength.

The sealing cap is applied about the periphery of the unit in such a way to facilitate automation of the operation.

The structure also lends itself to retrofitting, that is adding an additional pane or panes to an existing single or multi-pane structure.

Since the insulation value of the applicant's glazing units are better than a normal wall, it is possible to put in a larger window area and not lose on insulation.

A cap spanning the entire perimeter of the panes rather than merely a seal between their margins, makes assembly less cumbersome and less labor intensive, protects the edges of the glass, and gives additional sight area.

The applicant's construction fits in with the trend in the industry for coated glass to improve performance in cooling and heating. These coatings are metallic deposits which interfere with adhesion by conventional sealing methods. They include low emissivity coatings. According to the applicant's method there is no adhesion to the surface of the glass, but to the untreated periphery only. Conventionally, if one wants to adhere something to the surface of the glass the coating is removed at the margin. This is expensive.

The embodiments of the invention in which an exclusive property or privilege is claimed are defined as follows:

1. A sealed insulating glass unit, comprising an assembly of three panes of glass of the same areal dimensions in registering parallel spaced relationship with a plurality of spacer members sandwiched between adjacent panes, the spacer members being discs of slightly resilient plastic material having a diameter from about 0.0625 of an inch to about 0.0625 of an inch and an initial thickness from about 0.020 to 0.040 of an inch and slightly compressed, the spacer members being spaced-apart from about 1.5 to about 2.0 inches center-to-center between each pair of panes and the spacer members between different pairs of panes being staggered so that each spacer member between respective paris of panes is spaced-apart from any spacer member between the other pair of panes, the sealing cap being a mastic ribbon of plastic sealant highly adhesive to the edges of the panes and impermeable to gases whereby it provides a permanent vacuum-retaining seal, the spaces between the panes being under a permanent partial vacuum within the range from about 43 to about 76 cm of mercury, a layer of metal foil covering the outside of the mastic ribbon cap about the entire periphery of the unit, the unit having a total thickness within the rage from about 6.8 to about 9.8 mm.

2. A sealed insulating glass unit, comprising a central pane and a pair of outer panes with a plurality of spacer members sandwiched between them, sealing means for establishing a pair of hermetically sealed chambers, each of said chambers between a respective one of said outer panes and said central pane, the chambers being under partial vacuum whereby implosive pressure urges the panes together, the spacer members between the central pane and one of the outer panes being staggered from those between the central pane and the other outer pane.

3. A sealed insulating glass unit, as defined in claim 2, in which the sealing means is a mastic ribbon of a plastic sealant of low cohesive strength highly adhesive to the edges of the panes and having a low moisture-vapor transmission rate and impermeable to gases whereby it provides a permanent seal, the mastic means having been applied about the entire periphery of the unit and the vacuum having been drawn through a probe puncturing the mastic ribbon of the scaling means, the puncture made by the probe being closed after the partial vacuum is established by the self-healing nature of the mastic ribbon, whereby the scaling means is imperforate.

4. A sealed insulating glass unit, as defined in claim 3, in which the sealing means further includes a layer of metal foil covering the outside of the mastic ribbon about the entire periphery of the unit.

5. A sealed insulating glass unit, as defined in claim 4, in which the metal foil is aluminum and has a thickness of about 0.003 to about 0.007 inches.

6. A sealed insulating glass unit, as defined in claim in which the mastic cap has a thickness from about 0,0625 to about 0,1875 of an inch.

7. A sealed insulating glass unit, as defined in claim 3, which the mastic ribbon is a butyl-polyisobutylene insulating glass sealant.

8. A sealed insulating glass unit, as defined in claim 2, in which the sealing means is formed of a thin layer of solder adhering to a copper priming layer on the edges of the panes, the solder having been applied about the entire periphery of the unit and the vacuum having been drawn through a tube of solder, extending through the layer of solder, the tube having been closed after the partial vacuum is established by melting the solder whereby the layer of solder is imperforate.

9. A sealed insulating glass unit, as defined in claim 8 in which the layer of solder has a thickness between about 0.083 and 0.0625 of an inch.

10. A sealed insulating glass unit, as defined in claim 2 in which the spacer members are plastic discs from 0.0625 of an inch to 0.25 of an inch in diameter having an initial thickness from 0.020 to about 0.040 of an inch spaced-apart from about 1.5 to about 2.0 inches center-to center.

11. A sealed insulating unit, as defined in claim 2, in which the spaces between the outer panes are connected by a passage through the central pane.

12. A sealed insulating unit as defined in claim 2 wherein said spacer members are formed from transparent material.

13. A sealed insulating glass unit, as defined in claim 2, in which the spacer members are not adhesively secured to the surface of the glass.

14. A method of fabricating a sealed insulating glass unit, comprising the steps of:
   providing an assembly including a central pane, a pair of outer panes and two groups of spacer members;
   locating the spacer members of one of said groups between one of said outer panes and said central pane, and locating the spacer members of the other group between the other outer pane and said central pane;
   arranging said spacer members so that each of those of one group is staggered from each of those of the other group;
   sealing and partially evacuating said assembly in order to cause said outer panes to be pressed against said spacer members in order to form an insulating unit with improved properties.

15. A sealed insulating glass unit, as defined in claim 2, in which the panes are of low emissivity glass.

16. A sealed insulating glass unit, as defined in claim 2, in which the spacer members are of slightly resilient sheet plastic material and are slightly compressed by the glass surfaces.

17. A method as defined in claim 14 further including the steps of forming said spacing members from slightly resilient sheet plastic material and slightly compressing said spacer members between said central pane and said outer panes.

* * * * *